No. 882,723. PATENTED MAR. 24, 1908.
J. V. STRADLEY.
CORN SHELLER.
APPLICATION FILED JULY 13, 1906.
2 SHEETS—SHEET 2.
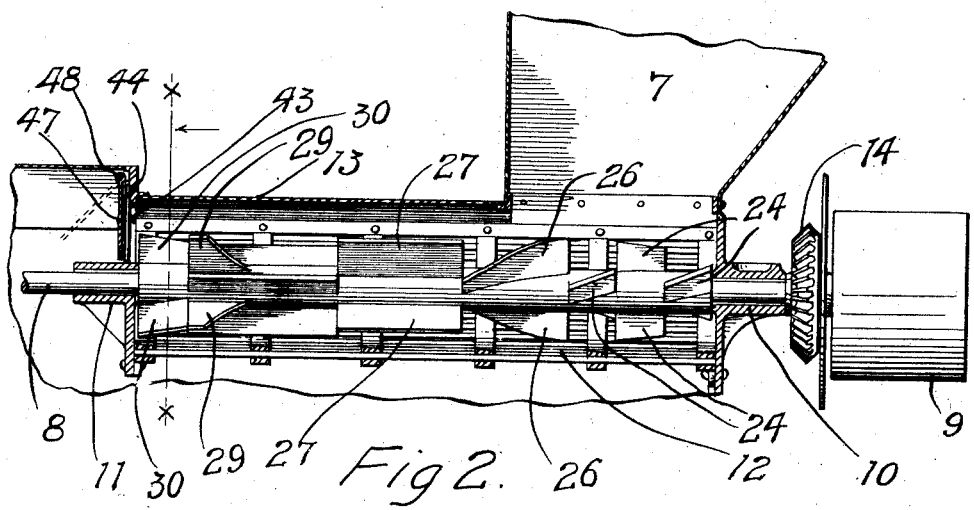
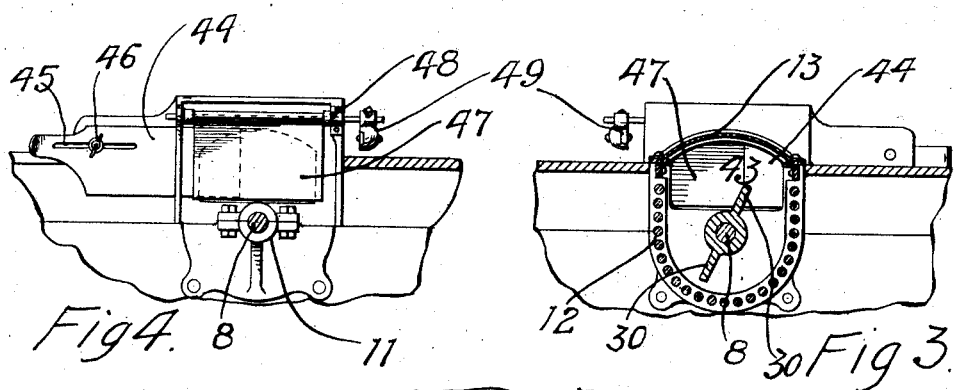
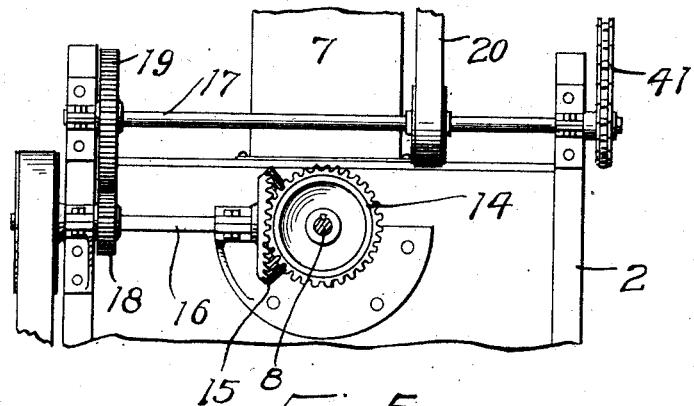
WITNESSES
INVENTOR
JOHN V. STRADLEY
BY
HIS ATTORNEYS

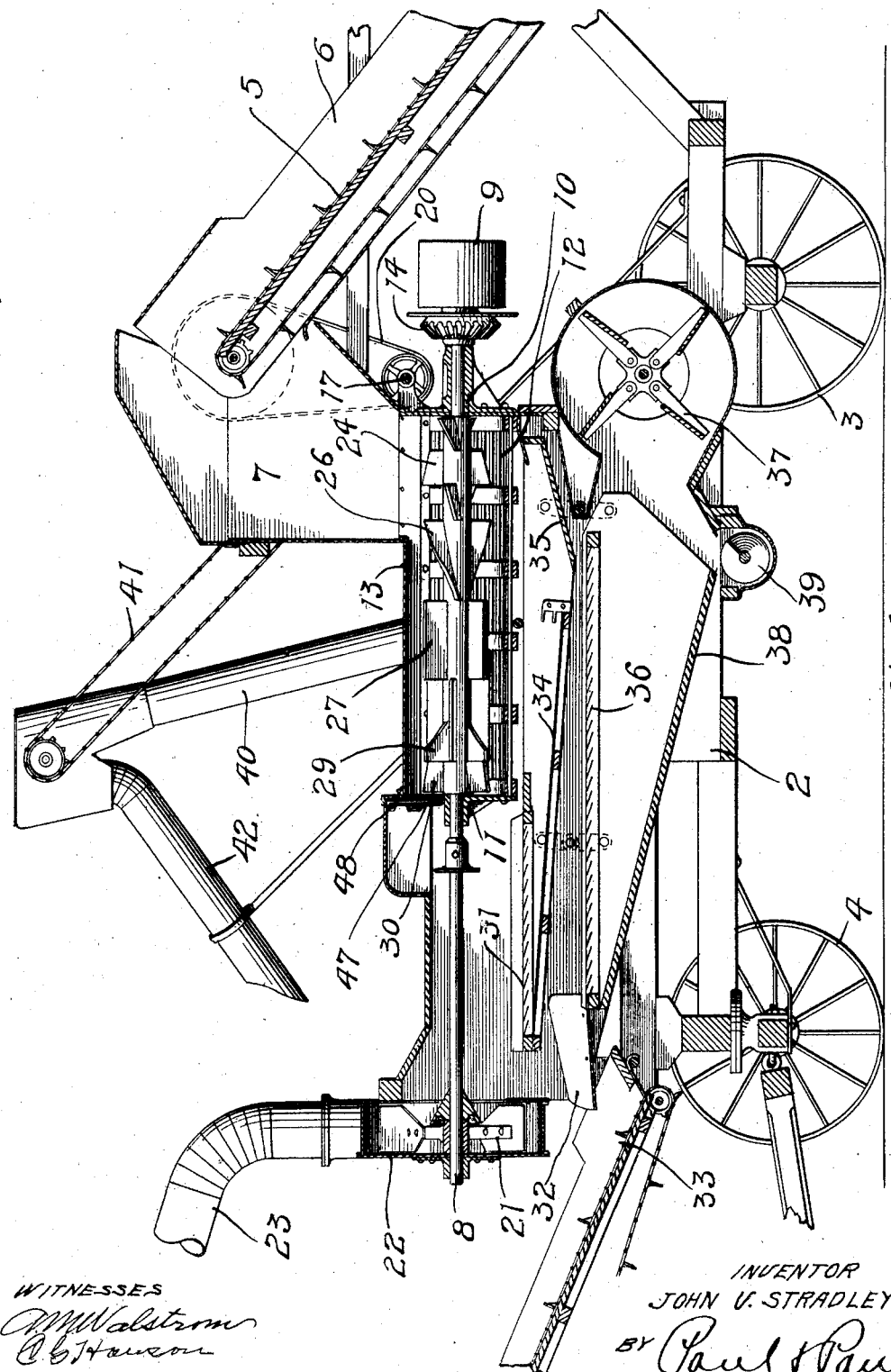

UNITED STATES PATENT OFFICE.

JOHN V. STRADLEY, OF MINNEAPOLIS, MINNESOTA, ASSIGNOR TO THE MINNEAPOLIS THRESHING MACHINE CO., OF MINNEAPOLIS, MINNESOTA, A CORPORATION OF MINNESOTA.

CORN-SHELLER.

No. 882,723.   Specification of Letters Patent.   Patented March 24, 1908.

Application filed July 13, 1906. Serial No. 326,042.

*To all whom it may concern:*

Be it known that I, JOHN V. STRADLEY, of Minneapolis, Hennepin county, Minnesota, have invented certain new and useful Improvements in Corn-Shellers, of which the following is a specification.

The object of my invention is to provide an improved corn shelling means, to the end that the efficiency and capacity of the machine may be increased.

The invention consists generally in an improved corn-shelling cylinder.

Further, the invention consists in providing a swinging gate or valve to automatically control the discharge of the cobs from the cylinder casing.

Further, the invention consists in various constructions and combinations, all as hereinafter described and particularly pointed out in the claims.

In the accompanying drawings, forming part of this specification; Figure 1 is a vertical longitudinal sectional view of a corn-shelling machine embodying my invention. Fig. 2 is a detail sectional view lengthwise of the shelling cylinder. Fig. 3 is a transverse sectional view on the line $x$—$x$ of Fig. 2. Fig. 4 is a view of the discharge end of the cylinder. Fig. 5 is a view of the opposite end showing the driving means therefor.

In the drawings, 2 represents the frame of the machine having carrying wheels 3 and 4 and a feed belt 5 operating in a casing 6 to deliver the corn into a hopper 7. Beneath the hopper is a shaft 8 extending lengthwise of the machine and having a driving pulley 9 at one end and journaled in the heads 10 and 11 of a cylinder casing 12. This casing has a grated lower portion which holds the corn up against the shelling cylinder and allows the escape of the kernels as fast as they are shelled from the cobs, and an arched upper portion 13 preferably of sheet metal forms a closed top or cover for the casing and prevents the kernels of corn from being thrown upward out of the machine during the shelling operation.

A gear 14 is mounted on the end of the cylinder shaft, meshing with a similar gear 15 on a counter shaft 16 which drives a shaft 17 through a pinion 18 and gear 19. A belt 20 from the shaft 17 drives the feed elevator. The opposite end of the shaft 10 from the driving pulley is provided with a fan 21 operating in a casing 22 and arranged to collect the chaff and light material discharged through the end of the cylinder and deliver it to a pipe 23.

A shelling cylinder is illustrated in Figs. 1 and 2 and is formed integrally with the shaft 10 on which it is mounted. The receiving end of said cylinder is provided beneath the discharge opening in the hopper, with a series of spirally arranged lugs or beaters 24. There are preferably six of these beaters and their function is to break the cobs and also perform a part of the shelling operation, and their spiral arrangement on the shaft produces an even force feed of the corn as it is discharged from the hopper. Adjoining the beaters 24 are two spiral wings 26 which assist in continuing the force feed. Adjoining the wings 26 are three straight wings 27 whose function is to assist in shelling the corn from the cobs.

Contiguous to the wings 27, I provide another set alternating in position on the cylinder with the series 27 and having substantially the same functions, and between these last named wings I provide three short tapering lugs 29 whose function is to throw the cobs outwardly toward the wall of the cylinder casing or cage; and lastly at the end of the cylinder I provide two spiral lugs or beaters 30 which tend to throw the cobs out of the casing upon the rack 31 from whence they are delivered over a slide 32 to a cob carrier 33. The shelled corn is directed by the plates 34 and 35 upon a sieve 36 and there subjected to a blast of air from a fan 37 which separates the dust and chaff from the corn and allows it to flow down over the plate 38 to a transverse conveyer 39. An elevator 40 is connected with the discharge end of the conveyer 39 and operated by a belt 41 from the shaft 17, a spout 42 being provided to allow the corn carried up by the elevator to be run to a wagon box or other receptacle.

At the discharge end of the cylinder I provide an opening 43 and a slide 44 adjustable in said opening by means of a slot 45 and thumb-nut 46, for the purpose of increasing or decreasing the size of said opening. A valve or gate 47 is hinged at 48 over said opening and has a weighted arm 49 which tends to hold the said gate in position to close said opening, but allows it to be pressed out by the accumulation of cobs in the cylinder to permit their discharge. This valve works automatically and controls the outlet of the cobs so that the corn may be shelled at any rate of speed.

The size of the discharge opening is easily varied by means of the slide 44 and the proper degree of opening is determined by the speed of the cylinder, it being desirable, of course, to keep the cobs in the cylinder until the corn is all shelled and as fast as the corn is separted from the cobs, to discharge the latter out of the cylinder casing.

The shelling cylinder is of very simple construction and as heretofore stated, is preferably cast on the shaft. The lugs at the receiving end will perform the initial shelling and feed the cobs along in the cylinder, each lug and wing thereon performing its function of shelling and feeding until the cobs reach the discharge end where the final shelling is performed and the cobs are thrown out of the cylinder casing.

The fan at the end of the cylinder shaft will create a considerable suction at the discharge end of the cylinder and carry away a large portion of the chaff and light refuse material thrown out with the cobs upon the rack 31.

I do not wish to be confined to any particular size of the beaters or wings on the cylinder, or to their exact relative position as considerable modification may be made therein without departing from the scope of my invention.

I claim as my invention:

1. In a corn sheller, the combination, with a hopper, of a shaft provided beneath the same, a shelling cylinder cast on said shaft and having a casing provided with a cob-discharge opening at one end, spiral cob breaking and feeding beaters mounted on said cylinder at its receiving end, spirally arranged feeding wings whereto the ears are delivered from said beaters, a series of straight shelling wings extending lengthwise of said cylinder in position to receive the ears from said spirally arranged feeding wings, a second series of straight wings alternating in position with said first series, a series of tapering lugs arranged between the straight wings of said second series to throw the cobs outwardly toward the wall of the cylinder casing, and a series of cob discharging beaters located at the discharge end of said cylinder near said cob discharge opening, substantially as described.

2. In a corn sheller, the combination, with a casing and a hopper provided at one end thereof, said casing having a discharge opening at the opposite end, of a shaft concentric with said casing, a shelling cylinder formed integrally on said shaft, a series of lugs mounted on the periphery of said cylinder beneath the receiving opening in said casing, said lugs having flat surfaces and arranged diagonally on said cylinder and provided with inclined outer ends, and spirally arranged wings adjacent to said lugs on said cylinder, said wings gradually decreasing in depth from their receiving to their discharge ends, substantially as described.

In witness whereof, I have hereunto set my hand this 30th day of June 1906.

JOHN V. STRADLEY.

Witnesses:
A. D. WELTON,
F. E. KENNETON.